United States Patent
Efaw

Patent Number: 5,845,603
Date of Patent: Dec. 8, 1998

[54] COMBINATION BRUSH AND FLEA POWDER DISPENSER

[76] Inventor: James W. Efaw, Rte. 4 Box 49, Mannington, W. Va. 26582

[21] Appl. No.: 44,310

[22] Filed: Mar. 19, 1998

[51] Int. Cl.$^6$ .................................................. A01K 13/00
[52] U.S. Cl. ............................................ 119/605; 119/625
[58] Field of Search .................................... 119/600, 602, 119/605, 607, 608, 609, 625, 603, 606; 433/88

[56] References Cited

U.S. PATENT DOCUMENTS

| | | | |
|---|---|---|---|
| 2,532,001 | 11/1950 | Williams | 119/605 |
| 4,956,892 | 9/1990 | Fawkes | 15/339 |
| 5,537,711 | 7/1996 | Tseng | 15/344 |
| 5,542,147 | 8/1996 | Merten | 15/321 |
| 5,655,481 | 8/1997 | Trahan | 119/606 |
| 5,762,433 | 6/1998 | Cary | 119/605 |

*Primary Examiner*—Thomas Price

[57] ABSTRACT

A new combination brush and flea powder dispenser for removing loose hairs and applying flea powder to a pet. The inventive device includes a housing including a lower handle portion and an upper brush portion. An open lower end of the lower handle portion has a power source disposed therein. The upper brush portion includes a plurality of hollow bristle members extending outwardly from a front face thereof. Each of the bristle members have an open inner end in communication with a central conduit that extends a length of the upper brush portion. A powder reservoir is disposed within the upper brush portion of the housing. The powder reservoir holds a supply of flea powder therein. A lower end of the reservoir has a dispensing tube extending outwardly therefrom. A pump is disposed within a lower end of the upper brush portion of the housing. The pump is coupled with a free end of the dispensing tube of the powder reservoir. The pump has an outlet tube extending outwardly therefrom and coupling with the central conduit. A motor is disposed within the lower handle portion of the housing. The motor is in communication with the pump and the power source.

5 Claims, 2 Drawing Sheets

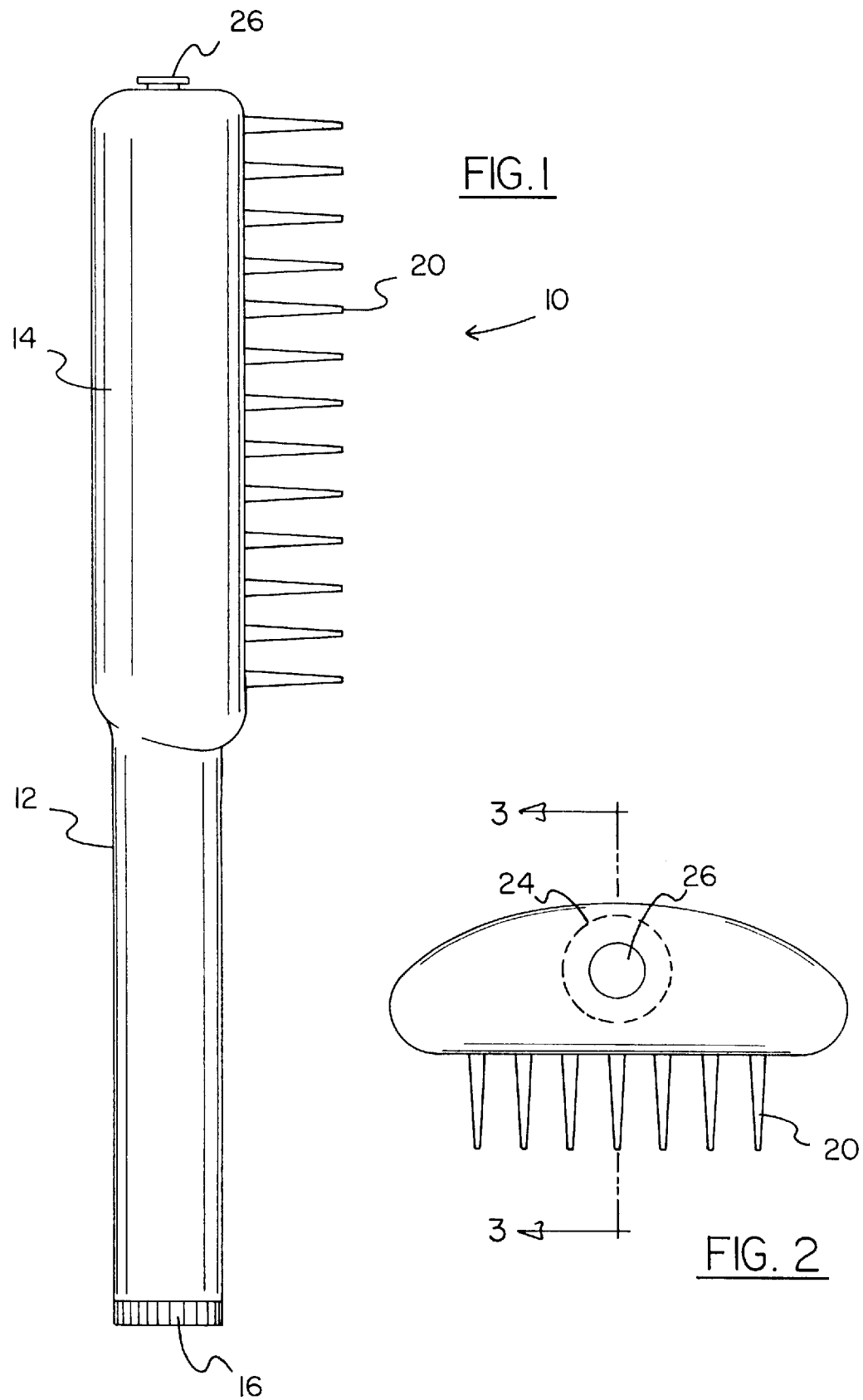

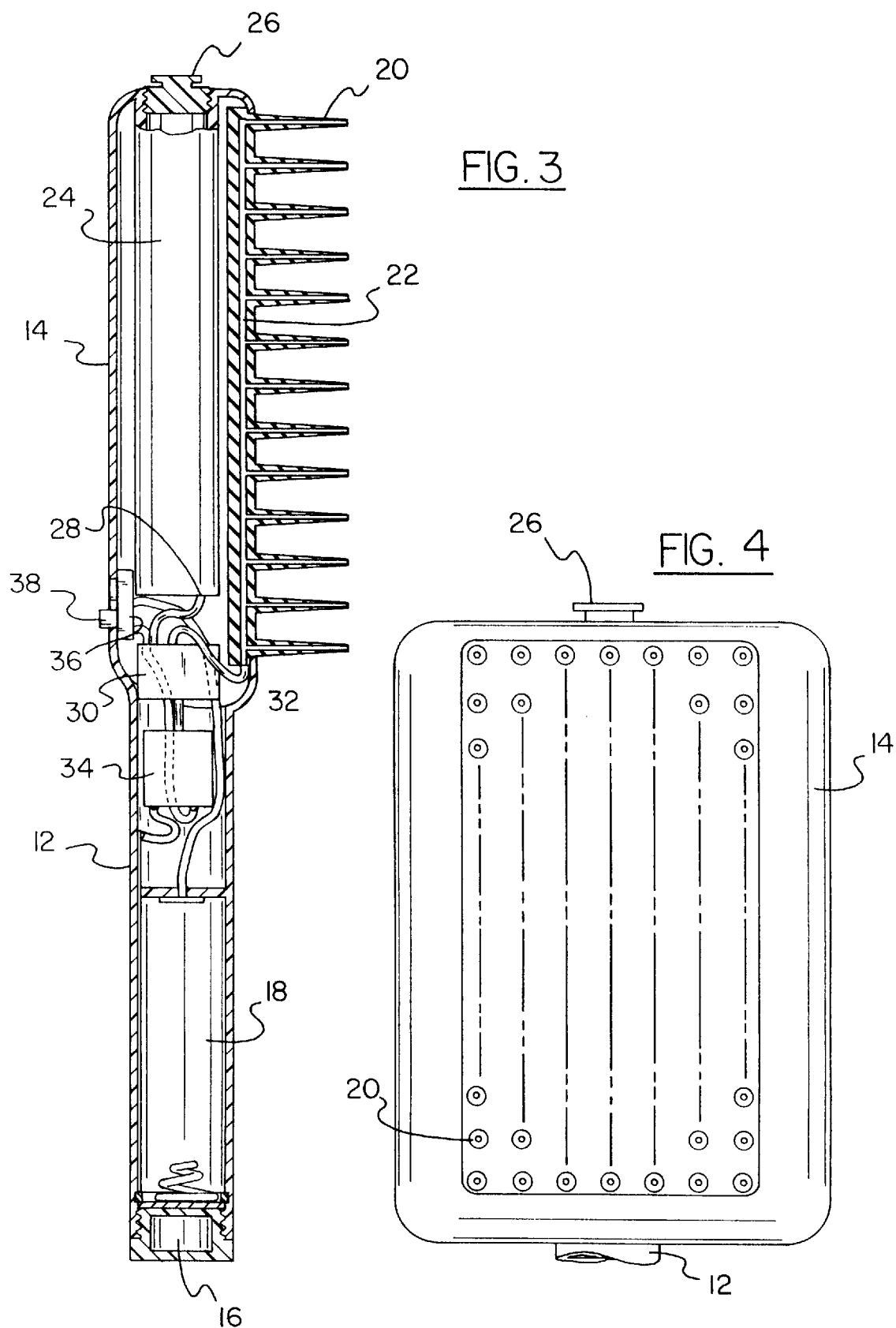

COMBINATION BRUSH AND FLEA POWDER DISPENSER

BACKGROUND OF THE INVENTION

1. Field of the Invention

The present invention relates to pet grooming tools and more particularly pertains to a new combination brush and flea powder dispenser for removing loose hairs and applying flea powder to a pet.

2. Description of the Prior Art

The use of pet grooming tools is known in the prior art. More specifically, pet grooming tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet grooming tools include U.S. Pat. No. 3,964,501 to Matchett; U.S. Pat. No. 4,543,913 to Wilkeson; U.S. Pat. No. 3,101,086 to Di Vito; U.S. Pat. No. 4,585,018 to O'Connor; U.S. Pat. No. 633,457 to Hotze; U.S. Pat. No. EPO-0611209A to Meulers; and PCT 0 WO 89/09002 to Busch.

While these devices fulfill their respective, particular objectives and requirements, the aforementioned patents do not disclose a new combination brush and flea powder dispenser. The inventive device includes a housing including a lower handle portion and an upper brush portion. An open lower end of the lower handle portion has a power source disposed therein. The upper brush portion includes a plurality of hollow bristle members extending outwardly from a front face thereof. Each of the bristle members have an open inner end in communication with a central conduit that extends a length of the upper brush portion. A powder reservoir is disposed within the upper brush portion of the housing. The powder reservoir holds a supply of flea powder therein. A lower end of the reservoir has a dispensing tube extending outwardly therefrom. A pump is disposed within a lower end of the upper brush portion of the housing. The pump is coupled with a free end of the dispensing tube of the powder reservoir. The pump has an outlet tube extending outwardly therefrom and coupling with the central conduit. A motor is disposed within the lower handle portion of the housing. The motor is in communication with the pump and the power source.

In these respects, the combination brush and flea powder dispenser according to the present invention substantially departs from the conventional concepts and designs of the prior art, and in so doing provides an apparatus primarily developed for the purpose of removing loose hairs and applying flea powder to a pet.

SUMMARY OF THE INVENTION

In view of the foregoing disadvantages inherent in the known types of pet grooming tools now present in the prior art, the present invention provides a new combination brush and flea powder dispenser construction wherein the same can be utilized for removing loose hairs and applying flea powder to a pet.

The general purpose of the present invention, which will be described subsequently in greater detail, is to provide a new combination brush and flea powder dispenser apparatus and method which has many of the advantages of the pet grooming tools mentioned heretofore and many novel features that result in a new combination brush and flea powder dispenser which is not anticipated, rendered obvious, suggested, or even implied by any of the prior art pet grooming tools, either alone or in any combination thereof.

To attain this, the present invention generally comprises a housing including a lower handle portion and an upper brush portion. An open lower end of the lower handle portion has an end cap coupled therewith. Removal of the end cap exposes a battery chamber within the lower handle portion. The battery chamber receives a battery therein. The upper brush portion includes a plurality of hollow bristle members extending outwardly from a front face thereof. Each of the bristle members have an open inner end in communication with a central conduit that extends a length of the upper brush portion. A powder reservoir is disposed within the upper brush portion of the housing. The powder reservoir holds a supply of flea powder therein. The reservoir has an access opening within an upper end of the upper brush portion with a cap removably coupled thereto. A lower end of the reservoir has a dispensing tube extending outwardly therefrom. A pump is disposed within a lower end of the upper brush portion of the housing. The pump is coupled with a free end of the dispensing tube of the powder reservoir. The pump has an outlet tube extending outwardly therefrom and coupling with the central conduit. A motor is disposed within the lower handle portion of the housing. The motor is in communication with the pump and contacts of the battery chamber. A power switch is disposed within the lower end of the upper brush portion of the housing. The power switch includes a button extending outwardly of the housing. The power switch is in communication with the motor for the selective activation thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination brush and flea powder dispenser apparatus and method which has many of the advantages of the pet grooming tools mentioned heretofore and many novel features that result in a new combination brush and flea powder dispenser which is not anticipated, rendered obvious, suggested, or even implied by any of the prior art pet grooming tools, either alone or in any combination thereof.

It is another object of the present invention to provide a new combination brush and flea powder dispenser which may be easily and efficiently manufactured and marketed.

It is a further object of the present invention to provide a new combination brush and flea powder dispenser which is of a durable and reliable construction.

An even further object of the present invention is to provide a new combination brush and flea powder dispenser which is susceptible of a low cost of manufacture with regard to both materials and labor, and which accordingly is then susceptible of low prices of sale to the consuming public, thereby making such combination brush and flea powder dispenser economically available to the buying public.

Still yet another object of the present invention is to provide a new combination brush and flea powder dispenser which provides in the apparatuses and methods of the prior art some of the advantages thereof, while simultaneously overcoming some of the disadvantages normally associated therewith.

Still another object of the present invention is to provide a new combination brush and flea powder dispenser for removing loose hairs and applying flea powder to a pet.

Yet another object of the present invention is to provide a new combination brush and flea powder dispenser which includes a housing including a lower handle portion and an upper brush portion. An open lower end of the lower handle portion has a power source disposed therein. The upper brush portion includes a plurality of hollow bristle members extending outwardly from a front face thereof. Each of the bristle members have an open inner end in communication with a central conduit that extends a length of the upper brush portion. A powder reservoir is disposed within the upper brush portion of the housing. The powder reservoir holds a supply of flea powder therein. A lower end of the reservoir has a dispensing tube extending outwardly therefrom. A pump is disposed within a lower end of the upper brush portion of the housing. The pump is coupled with a free end of the dispensing tube of the powder reservoir. The pump has an outlet tube extending outwardly therefrom and coupling with the central conduit. A motor is disposed within the lower handle portion of the housing. The motor is in communication with the pump and the power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new combination brush and flea powder dispenser according to the present invention.

FIG. 2 is a top plan view of the present invention.

FIG. 3 is a cross-sectional view of the present invention as taken along line 3—3 of FIG. 2.

FIG. 4 is a front view of the present invention illustrated in FIG. 3.

DESCRIPTION OF THE PREFERRED EMBODIMENT

With reference now to the drawings, and in particular to FIGS. 1 through 4 thereof, a new combination brush and flea powder dispenser embodying the principles and concepts of the present invention and generally designated by the reference numeral 10 will be described.

As best illustrated in FIGS. 1 through 4, the combination brush and flea powder dispenser 10 comprises a housing including a lower handle portion 12 and an upper brush portion 14. An open lower end of the lower handle portion 12 has an end cap 16 coupled therewith. Removal of the end cap 16 exposes a battery chamber 18 within the lower handle portion. The battery chamber 18 receives a battery therein. The upper brush portion 14 includes a plurality of hollow bristle members 20 extending outwardly from a front face thereof. Each of the bristle members 20 have an open inner end in communication with a central conduit 22 that extends a length of the upper brush portion 14.

A powder reservoir 24 is disposed within the upper brush portion 14 of the housing. The powder reservoir 24 holds a supply of flea powder therein. The reservoir 24 has an access opening within an upper end of the upper brush portion 14 with a cap 26 removably coupled thereto. A lower end of the reservoir 24 has a dispensing tube 28 extending outwardly therefrom.

A pump 30 is disposed within a lower end of the upper brush portion 14 of the housing. The pump 30 is coupled with a free end of the dispensing tube 28 of the powder reservoir 24. The pump 30 has an outlet tube 32 extending outwardly therefrom and coupling with the central conduit 22. When activated, the pump 30 will draw flea powder out of the reservoir 24 and force the powder through the central conduit 22 to be dispensed outwardly of the plurality of bristles 20 onto the pet.

A motor 34 is disposed within the lower handle portion 12 of the housing. The motor 34 is in communication with the pump 30 and contacts of the battery chamber 18. The motor 34 will serve to generate the power to activate the pump 30.

A power switch 36 is disposed within the lower end of the upper brush portion 14 of the housing. The power switch 36 includes a button 38 extending outwardly of the housing. The power switch 36 is in communication with the motor 34 for the selective activation thereof.

In use, the pet owner would simply hold the present invention in their hand and use it to brush the pet's coat. The loose hairs would be trapped by the bristles 20, leaving the pet shiny, attractive, and shed-free. While brushing, the user could periodically press the button 38 of the power switch 36 to release the flea powder. The powder would thus be worked down to the roots of the hair rather than remaining on the surface hair.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new combination brush and flea powder dispenser for removing loose hairs and applying flea powder to a pet comprising, in combination:

a housing including a lower handle portion and an upper brush portion, an open lower end of the lower handle portion having an end cap coupled therewith, removal of the end cap exposing a battery chamber within the lower handle portion, the battery chamber receiving a battery therein, the upper brush portion including a plurality of hollow bristle members extending outwardly from a front face thereof, each of the bristle members having an open inner end in communication with a central conduit that extends a length of the upper brush portion;

a powder reservoir disposed within the upper brush portion of the housing, the powder reservoir holding a supply of flea powder therein, the reservoir having an access opening within an upper end of the upper brush portion with a cap removably coupled thereto, a lower end of the reservoir having a dispensing tube extending outwardly therefrom;

a pump disposed within a lower end of the upper brush portion of the housing, the pump being coupled with a free end of the dispensing tube of the powder reservoir, the pump having an outlet tube extending outwardly therefrom and coupling with the central conduit;

a motor disposed within the lower handle portion of the housing, the motor being in communication with the pump and contacts of the battery chamber;

a power switch disposed within the lower end of the upper brush portion of the housing, the power switch including a button extending outwardly of the housing, the power switch being in communication with the motor for selective activation thereof.

2. A new combination brush and flea powder dispenser for removing loose hairs and applying flea powder to a pet comprising, in combination:

a housing including a lower handle portion and an upper brush portion, the lower handle portion having a power source therein, the upper brush portion including a plurality of hollow bristle members extending outwardly from a front face thereof, each of the bristle members having an open inner end in communication with a central conduit that extends a length of the upper brush portion;

a powder reservoir disposed within the upper brush portion of the housing, the powder reservoir holding a supply of flea powder therein, a lower end of the reservoir having a dispensing tube extending outwardly therefrom;

a pump disposed within a lower end of the upper brush portion of the housing, the pump being coupled with a free end of the dispensing tube of the powder reservoir, the pump having an outlet tube extending outwardly therefrom and coupling with the central conduit;

a motor disposed within the lower handle portion of the housing, the motor being in communication with the pump and contacts of the power source.

3. The combination brush and flea powder dispenser as set forth in claim 2 wherein an open lower end of the lower handle portion has an end cap coupled therewith, removal of the end cap exposing a battery chamber within the lower handle portion, the battery chamber receiving a battery therein.

4. The combination brush and flea powder dispenser as set forth in claim 2 wherein the powder reservoir has an access opening within an upper end of the upper brush portion with a cap removably coupled thereto.

5. The combination brush and flea powder dispenser as set forth in claim 2 and further including a power switch disposed within the lower end of the upper brush portion of the housing, the power switch including a button extending outwardly of the housing, the power switch being in communication with the motor for selective activation thereof.

* * * * *